Oct. 21, 1924.
T. E. GILMORE
CLAMPING BASE
Filed June 5, 1923
1,512,416
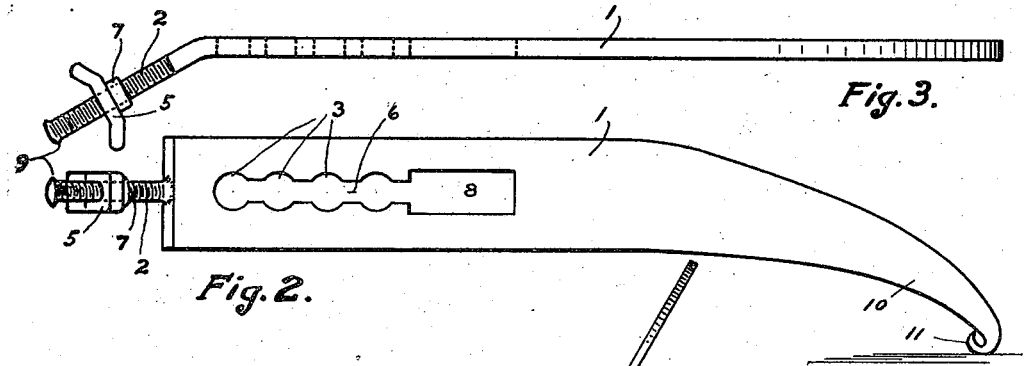
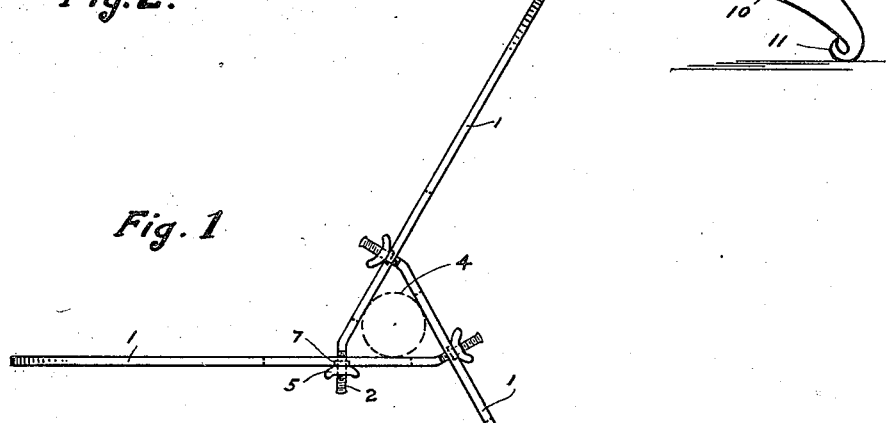
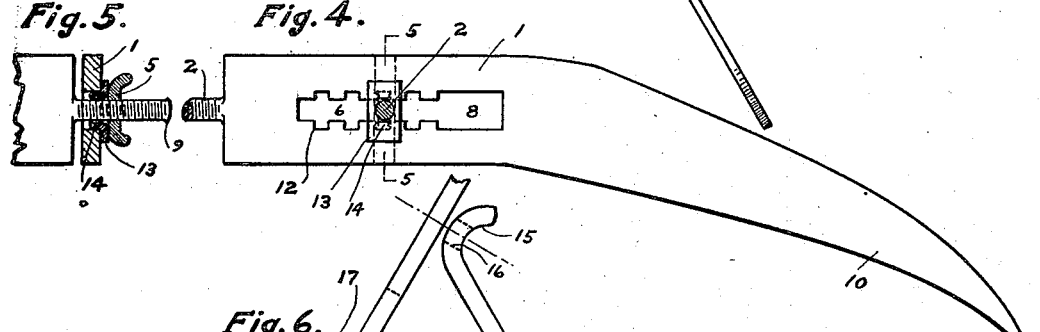
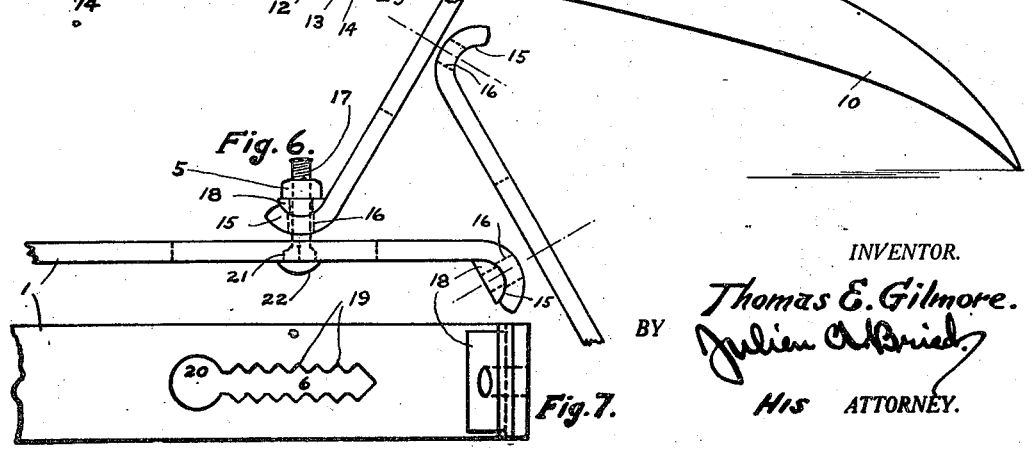
INVENTOR.
Thomas E. Gilmore.
BY Julien A. Bried
HIS ATTORNEY.

Patented Oct. 21, 1924.

1,512,416

UNITED STATES PATENT OFFICE.

THOMAS E. GILMORE, OF OAKLAND, CALIFORNIA.

CLAMPING BASE.

Application filed June 5, 1923. Serial No. 643,538.

*To all whom it may concern:*

Be it known that I, THOMAS E. GILMORE, a citizen of the United States, residing at Oakland, in the county of Alameda and State of California, have invented new and useful Improvements in a Clamping Base, of which the following is a specification and which is illustrated in the accompanying drawings.

My invention relates to detachable and adjustable bases, particularly as might be useful to form legs for a portable sign post, a store display pole, a Christmas tree, a course marking flag, or any similar article.

It has for its principal objects, such a base which is simple in construction, cheap to manufacture, and one which will be wide in its application on account of its adjustability to hold various sizes of objects, and will tightly clamp the article to hold it firmly, yet which may be easily taken apart for packing in a small place.

The objects outlined above are obtained in my new clamping base as shown in the drawings accompanying this application and forming a part hereof, and in which:—

Fig. 1 is a plan view of one of my clamping bases having three legs. Fig. 2 is an enlarged side view of one of the legs.

Fig. 3 is a view of edge of the leg looking down on Fig. 2.

Fig. 4 is an enlarged view of the side of one leg showing an optional arrangement of the fastening device. Fig. 5 being an end sectional view of Fig. 4.

Fig. 6 is an assemblage showing the center parts of still another modification of fastening my device, and Fig. 7 is a side view of one of the legs of Fig. 6 showing the special slotting, with the bolt omitted.

In the drawings all similar parts have similar numerals, and in reference to Figures 1, 2, and 3, my clamping base will be seen to consist of several duplicate legs 1 as detailed in Figure 2, all bolted together in an assemblage as shown in the plan view Figure 1.

I ordinarily use three legs as shown tho more can be used if desired, also the legs may be any desired proportion or length, depending on the exact use to which the base will be put.

In the construction shown in these figures the legs each have a series of holes 3 in the sides, and a threaded bolt end 2 formed integral with and extending from one end of the flat bar 1 of which the leg is formed.

The legs are placed together in the manner shown in Figure 1 each with its bolt end extending through the opening of the adjacent leg to form a three sided contractile enclosure in the center of the assemblage and in which the lower end of a flag pole, sign post, Christmas tree, or other vertical object, as dotted at 4 in Figure 1, is adapted to be clamped upon drawing the bars together by means of the nuts 5 screwed on the bolt extensions 2 of each leg. The bolt extensions are bent slightly out of line with the bar as shown best in Figure 3 in order to permit the bolts to pass at right angles to the bar to which they are to be secured by the nuts.

The holes 3 through which the bolt ends pass may be separate holes but are better connected as shown by slots 6 to permit of passing the bolt end along to any desired position in adjusting the assemblage for different size objects to be clamped.

The nut 5 which may be an elongated wing-nut as shown or a plain nut, is formed with a rounded extending nose 7 to fit within the main holes or enlarged portions 3 of the slot, and thereby centralize the bolt therein and prevent it from displacement upon tightening the nuts to clamp an object in place.

At 8 is shown a still larger portion of the slot to permit of insertion or withdrawal of the nut after loosening it without removing it from the bar end, thus adapting the extreme end of the bolt to be riveted over as shown at 9 to prevent loss of the nut.

It is of course apparent that plain slots might be used instead of the connected series of holes, but there is then the tendency for the bars to slip and release their hold on the object clamped, or to be drawn out of symmetrical arrangement.

To form a better looking device and also to elevate the clamping grip above the ground or floor upon which it is to be used I taper the bars toward the outer ends and bend them downward as shown at 10 in Figure 2, and where marring the floor is to be prevented I roll up the final point as shown at 11.

In the modification shown in Figures 4 and 5 the slot is formed with a series of square notches 12, and the nut 5 instead of having a rounded nose co-operates with a locking plate 13, which upon loosening the nut may be backed out and dropped into any of the notches, fitting therein as clearly shown in the central end cross section Figure 5, wherein 14 is one of the two little tits bent inward along the sides of the bolt end and which fall into the square notches 12. In Figure 4 the wing-nut 5 is omitted to reveal the plan formation of the locking plate 13.

In Figures 6 and 7 a still further modification is shown and wherein the bars 1 are each curved at the engaging ends as shown at 15 having a hole therein at 16 for a common carriage bolt 17. This bolt passes through a keeper washer 18 fitting the curved end of the rod and providing a flat support on the outer side against which the nut 5 may be turned.

The square neck 21 of the carriage bolt locks in the slot of the adjoining bar by dropping into any of the various notches 19, and the head 22 may be inserted or withdrawn in assembling or dis-assembling by passing it through the enlarged end 20 of the slot 6.

It will thus be seen that my clamping base consists of a group of duplicate elements of extreme simplicity which may be quickly assembled into a rigid group which will tightly clamp any object inserted through the opening which they embrace, and that they are capable of considerable adjustment thereby adapting the base for objects of considerable variation in size, and, while I have shown several modifications of the elements of my base, I do not wish to limit myself to these as many more might be made, and in my appended claims I wish to cover any other such modifications as come within the scope of my invention:—

I claim,

1. A clamping base comprising three duplicate flattened metal bars arranged on edge to form a triangular enclosure, the end of each bar being reduced and passing through an opening in the side of the next bar and provided with a nut threaded to the reduced portion for drawing the bars together to contract the enclosure, said reduced portion of each bar being bent out of line with its bar to pass at right angles through the side of the next bar.

2. In a clamping base, a flattened metal bar with a reduced extension on one end, said reduced extension being bent at an angle to the run of the bar when viewed on edge, and the bar having an opening in its side adapted to receive the extension of a similar bar, and the bar being bent edgewise for elevating the threaded ends of the bar from a common supporting surface when three of the bars are grouped each with its extension in the opening of the next bar.

3. In a clamping base, a flattened metal bar having a threaded extension formed on one end, a nut on said extension, a slot through the side of the bar near said extension of a size to pass the similar extension of a similar bar, said slot having a series of notches and an enlarged portion adapted to pass a similar nut on a similar extension of a similar bar, and means associated with the nut for locating the extension on the bar within the notched portion of the slot of a similar bar for clamping it thereto by the nut.

4. In a clamping base, a flat metal bar having a threaded extension formed on one end, a series of round holes through the side of the bar adjacent said extension connected together by a slot of a size to admit the extension of a similar bar, a nut for said extension having a round nose adapted to seat within one of the holes for clamping the bar to a similar bar with the extension centralized in one of its holes.

5. In a clamping base, a flat metal bar having a threaded extension formed on one end, a nut for said extension having a round nose, a series of holes through the side of the bar adjacent said extension connected together by a slot of a size to admit the extension of a similar bar, said slot having an enlarged portion adapted to pass the nut, said nut being adapted to seat its nose in any of the holes for centralizing therein the extension of a similar bar and to clamp such similar bar to the bar.

THOMAS E. GILMORE.